United States Patent
Chen et al.

(10) Patent No.: US 10,858,606 B2
(45) Date of Patent: Dec. 8, 2020

(54) STRUCTURED COMPOSITE WOOD PELLETS FOR DUST/FINES MITIGATION AND METHOD OF PRODUCING THEM

(71) Applicant: Arr-Maz Products, L.P., Mulberry, FL (US)

(72) Inventors: Frank Bor-Her Chen, Lakeland, FL (US); Nabil Naouli, Lithia, FL (US); Paul A. Williams, Valrico, FL (US)

(73) Assignee: ARR-MAZ PRODUCTS, L.P., Mulberry, FL (US)

( * ) Notice: Subject to any disclaimer, the term of this patent is extended or adjusted under 35 U.S.C. 154(b) by 85 days.

(21) Appl. No.: 15/990,205

(22) Filed: May 25, 2018

(65) Prior Publication Data

US 2018/0355268 A1 Dec. 13, 2018

Related U.S. Application Data

(60) Provisional application No. 62/518,723, filed on Jun. 13, 2017.

(51) Int. Cl.
*C10L 5/32* (2006.01)
*C10L 5/36* (2006.01)
*C10L 5/44* (2006.01)

(52) U.S. Cl.
CPC .............. *C10L 5/32* (2013.01); *C10L 5/363* (2013.01); *C10L 5/442* (2013.01); *C10L 2200/0469* (2013.01); *C10L 2290/20* (2013.01); *C10L 2290/22* (2013.01)

(58) Field of Classification Search
CPC combination set(s) only.
See application file for complete search history.

(56) References Cited

U.S. PATENT DOCUMENTS

| | | | |
|---|---|---|---|
| 4,398,917 A | 8/1983 | Reilly | |
| 5,910,454 A | 6/1999 | Sprules | |
| 6,589,442 B1 | 7/2003 | Wilson et al. | |
| 8,871,345 B2 | 10/2014 | Kikuchi et al. | |
| 8,951,309 B2 | 2/2015 | Bragdon | |
| 9,511,508 B2 | 12/2016 | Warnes et al. | |
| 9,809,775 B2 | 11/2017 | Iverson et al. | |
| 2006/0230673 A1 | 10/2006 | Barford et al. | |
| 2007/0251143 A1 | 11/2007 | Michalek et al. | |
| 2008/0206572 A1 | 8/2008 | Edelmann et al. | |
| 2010/0146850 A1 | 6/2010 | Bexell | |
| 2011/0256449 A1 | 10/2011 | Mao | |
| 2012/0204482 A1 | 8/2012 | Heimann | |
| 2013/0133246 A1 | 5/2013 | Blieninger | |
| 2013/0239850 A1* | 9/2013 | Naidoo | E01C 7/265 106/230 |
| 2013/0306518 A1* | 11/2013 | Petri | C10G 3/50 208/94 |
| 2015/0203774 A1* | 7/2015 | Lake | C10L 5/143 44/564 |
| 2016/0169581 A1 | 6/2016 | Kotyk | |
| 2016/0304800 A1* | 10/2016 | Rautialinen | C10L 9/083 |

FOREIGN PATENT DOCUMENTS

| | | |
|---|---|---|
| CA | 1229229 | 11/1987 |
| CA | 2670530 | 12/2010 |
| CN | 103992835 | 8/2016 |
| EP | 0725128 | 7/1996 |
| EP | 2216387 | 12/2012 |
| EP | 2602295 | 6/2013 |
| JP | 2010121047 | 6/2010 |
| KR | 20100011691 | 5/2009 |
| WO | 2002055637 | 7/2002 |
| WO | 2009006661 | 1/2009 |
| WO | 2011062488 | 5/2011 |
| WO | 2013030311 | 3/2013 |

OTHER PUBLICATIONS

Craven, J.M. etc. "Hydrophobic coatings for moisture stable wood pellets", Biomass and Bioenergy 80 (2015) 278-285.
Tarasov, Dmitry et al., "Effect of additives on wood pellet physical and thermal characteristics: A review", ISRN Forestry, 2013, vol. 2013, Article No. 8769.
International Search Report and Written Opinion in PCT/US2018/035647; International Application Division; Korean Intellectual Property Office 189 Cheongsa-ro, Seo-gu, Daejeon, 35208, Republic of Korea, dated Sep. 20, 2018.

* cited by examiner

*Primary Examiner* — Ellen M McAvoy
*Assistant Examiner* — Chantel L Graham
(74) *Attorney, Agent, or Firm* — Head, Johnson, Kachigian & Wilkinson, PC

(57) ABSTRACT

Structured composite wood pellets comprising wood pellets with a coating at least partially covering the wood pellets, where the coating reduces the generation of dust/fines of the wood pellet upon impact and/or abrasion. The coating may comprise crude tall oil, distilled tall oil, tall oil pitch, tall oil fatty acids, tall oil heads, non-food use sustainable wax, or a combination thereof. The coating may be located at the surface and/or subsurface of the wood pellets rather than throughout, and may be applied at a rate of less than 1 wt. % of the wood pellets.

18 Claims, No Drawings

STRUCTURED COMPOSITE WOOD PELLETS FOR DUST/FINES MITIGATION AND METHOD OF PRODUCING THEM

CROSS REFERENCE

This application is based on and claims priority to U.S. Provisional Application No. 62/518,723 titled "Structured Composite Wood Pellets for Dust/Fines Mitigation and Method of Producing Them" filed Jun. 13, 2017.

BACKGROUND OF THE INVENTION

Field of the Invention

This invention relates generally to structured composite wood pellets for dust/fines mitigation and method of producing them, and more particularly, but not by way of limitation, to a coating for the surface and/or subsurface of wood pellets that improves the resistance to dust/fines generation of the wood pellets upon impact and abrasion.

Description of the Related Art

Wood pellets are often used as fuel for industrial power plants and for residential uses, such as barbeque grill fuel and other uses. Such wood pellets, however, break easily and tend to generate dust upon impact and abrasion, such as during shipping and handling. In fact, for industrial use, such wood pellets are designed to be ground up prior to use. This can be a major hazard at places where wood pellets are handled in bulk, such as at ports during loading and unloading, causing concerns about human safety, fire hazard, and fines by the port authority.

Based on the foregoing, it is desirable to provide a structured composite wood pellet that is resistant to dust/fines generation upon impact and abrasion.

It is further desirable for such resistance to come from a coating at the wood pellet's surface and/or subsurface.

It is further desirable for such a coating to be easily applied for mass production of the structured composite wood pellet for dust/fines mitigation.

It is further desirable for such a coating to be green and sustainable.

SUMMARY OF THE INVENTION

In general, in a first aspect, the invention relates to a treated wood pellet comprising a wood pellet and a coating at least partially covering the wood pellet, where the coating reduces the generation of dust/fines of the wood pellet upon impact and/or abrasion. The coating may increase the durability of the wood pellet. The coating may be capable of reacquiring fugitive dust from the wood pellet. The coating may be capable of maintaining the reduction of the generation of dust/fines of the wood pellet upon impact and/or abrasion after 30 days of storage.

The coating may comprise one or more ingredients, where the ingredients comprise crude tall oil, distilled tall oil, tall oil pitch, tall oil fatty acids, tall oil heads, non-food use sustainable wax such as natural alcohol bottoms, or a combination thereof. The coating ingredients may be pine chemicals, which may comprise crude tall oil and/or one or more fractions from crude tall oil. The coating may not comprise chemicals that are not crude tall oil or fractions of crude tall oil. The coating may not comprise ingredients that come from seeds or comprise triglyceride. The coating may not comprise lignin. The coating may comprise tall oil pitch and tall oil heads in a range from 90% tall oil pitch and 10% tall oil heads to 55% tall oil pitch and 45% tall oil heads. In particular, the coating may comprise 60% tall oil pitch and 40% tall oil heads.

The wood pellet may comprise compressed wood and may be coated with fines. The wood pellet may not comprise torrified wood.

The coating may be located at a surface and/or subsurface of the wood pellet, but not throughout the wood pellet. The coating may not be a binder or a constituent of a binder within the wood pellet. The coating may comprise less than 1 wt. % of the total weight of the treated wood pellet. The coating may particularly comprise less than approximately 0.8 wt. % of the wood pellet, less than approximately 0.6 wt. % of the wood pellet, or less than approximately 0.4 wt. % of the wood pellet.

The treated wood pellet may have an average abraded dust level reduction of at least 90% compared to the abraded dust level of the wood pellet. The average abraded dust level reduction of the treated wood pellet may not reduce by more than 3% after 30 days of storage. The treated wood pellet may have an average respirable dust level of less than 2.5 mg/m3.

In a second aspect, the invention relates to a method of producing the treated wood pellet described above, the method comprising at least partially covering the wood pellet with the coating. The coating may be applied through spraying, dripping, and/or dipping, and may be applied in a rotary drum mixer, a ribbon blender with soft ribbon and soft wall, or a continuous dip coater or may be sprayed onto wood pellets on a moving belt or while falling.

In a third aspect, the invention relates to the coating itself, as described above.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to structured composite wood pellets for dust/fines mitigation and a method of producing them. While reference is made throughout to wood pellets and the wood pellet manufacturing process, the same coating and method of producing pellets may be utilized in the manufacture of other materials to similar effect. In particular, the coating and method may be used in the production of other biomasses and/or energy pellets, such as in the production of bagasse.

The wood pellets may be conventional wood pellets with a coating located at the surface and/or subsurface. The treated wood pellets may provide improved resistance to dust/fines generation upon impact and abrasion. The treated wood pellets may additionally provide increased durability over untreated wood pellets. The coating may not increase the elasticity of the wood pellets; rather, the coating may reacquire fugitive dust. The treated wood pellets may maintain their resistance to dust/fines generation over time. For example, the treated wood pellets may display a less than 3% change in the measured abraded dust reduction level over 30 days of storage.

The wood pellets may be 1" long and ¼" in diameter, or any other desired size. They may be made of compressed wood. The wood pellets may not comprise torrified wood.

The coating may be crude tall oil, distilled tall oil, tall oil pitch, tall oil fatty acids, tall oil heads, non-food use sustainable wax such as natural alcohol bottoms, or a combination thereof. The coating may particularly be pine chemicals, and may comprise crude tall oil and/or one or more fractions from crude tall oil. The coating ingredients may not be vegetable oil in the normal sense, in that they may not come from seeds and may not comprise triglyceride. The coating may not comprise lignin.

The ingredients of the coating may be combined at certain ratios and concentrated at the surface and/or subsurface of the wood pellets to produce unique wood pellets that may provide needed dust/fines mitigation. For example, the coating may comprise tall oil pitch and tall oil heads in any desired ratio. In particular, the coating may comprise anywhere from 90% tall oil pitch and 10% tall oil heads to 55% tall oil pitch and 45% tall oil heads. In particular, the coating may comprise tall oil pitch and tall oil heads mixed at a ratio of 6/4. In another example, the coating may comprise crude tall oil and tall oil pitch in equal proportions, producing a 50%/50% mixture. Alternately, the coating may comprise a single ingredient; two ingredients mixed at a ratio of 9/1, 7/3, or 6/4; three ingredients mixed at a ratio of 5/3/2; or any other desired number of ingredients and/or ratio. The resultant coating mixture may be tacky enough to make fugitive dust stick to the treated wood pellets, but may not be tacky enough to cause the treated wood pellets to stick together. The coating mixture may be heated for mixing and/or application, but may still be spreadable after cooling.

The coating material may not be integrally formed with the wood pellets, but may be applied after formation of the wood pellets. The coating material may not be located throughout the wood pellets, as is typical of materials used as or in a binder within wood pellets, but rather may be concentrated on the surface and/or subsurface. For example, the coating may not penetrate the wood pellets more than about 400 microns, not more than 300 microns, not more than 200 microns, or not more than 100 microns. Thus, less of the coating material may be required than the amount of material required for use as or in a binder, as the coating is located only on the surface and/or subsurface rather than throughout the wood pellets. This decreases the cost of the finished product, as compared to a wood pellet with the same materials used as a binder. The coating may completely cover the surface of the treated wood pellets, or may only partially cover the surface of the treated wood pellets. The coating rate may be below coat rate of 1 wt. % based on the weight of the wood pellets. In particular, the coating may be applied at a rate of less than approximately 0.8 wt. %, less than approximately 0.6 wt. %, or less than approximately 0.4 wt. % based on the weight of the wood pellets.

The coating may be applied using a rotary drum mixer, a ribbon blender with soft ribbon and soft wall, a continuous dip coater, or other machine or may be applied through spraying the pellets while on a moving belt or while falling. The structured composite wood pellets may be mass produced in a continuous manner through spraying, dripping, and/or dipping.

The coating and resultant treated wood pellets may be green and sustainable. Alternately, conventional non-green and non-sustainable coatings may be applied, either alone or in combination with green and sustainable coatings.

EXAMPLES

During testing, a dust control agent was applied to wood pellets at a certain wt. % by hand spray or by pipet in a drop by drop manner, followed by blending in a rotary bucket for four minutes. Dust and fines were not removed prior to treating the wood pellets, but rather were used as received with dust and fines in place.

Abrasion dust generation was tested by weighing 800.00 g of wood pellets and placing them in a 3-lb capacity water tight rubber barrel. The wood pellets were abraded on a tumbler for 150 seconds at approximately 44 rpm. During the abrasion test, air was drawn into the rubber barrel and the dust level was monitored continuously with a light scattering particle size monitor. The average dust level (mg/m3) was taken across the 150 seconds.

Mechanical durability was tested by weighing 500.00 g of wood pellets (w1) and placing them in a compartment of a Seedburo pellet durability tester (Model # PDT4). The compartment was rotated for ten minutes and then the wood pellets were discharged into a Teflon coated tray. Dust and fines were then removed from the collected wood pellets and the wood pellets were weighed (w2). The mechanical durability was calculated as [w2/w1]×100%.

When dust and fines were removed from the wood pellets, the method of dust and fines removal comprised placing the wood pellets onto a 14"×23" sieve screen (0.315 mm) above a collecting rubber bucket and brushing off dust and fines with a paint brush.

Example 1

As a control, uncoated wood pellets were subjected to the abrasion dust generation test and the mechanical durability test. The average abraded dust level was 13.4 mg/m3 and the mechanical durability measured 97.9%.

Example 2

Wood pellets were treated with 0.11 wt. % of crude tall oil (CTO) and tested for abrasion dust generation and mechanical durability. The average abraded dust level reduction was 97.9% compared to the dust level of the uncoated wood pellets, as described in Example 1. The mechanical durability measured 98.2%.

Example 3

Wood pellets were treated with 0.44 wt. % of CTO and tested for abrasion dust generation. The average abraded dust level reduction was 97.6% compared to the dust level of the uncoated wood pellets, as described in Example 1.

Example 4

Wood pellets were treated with 0.44 wt. % of CTO and natural alcohol bottoms (NABs) blended at a 9/1 ratio and tested for abrasion dust generation. The average abraded dust level reduction was 96.1% compared to the dust level of the uncoated wood pellets, as described in Example 1.

Example 5

Wood pellets were treated with 0.44 wt. % of CTO and NAB blended at a 7/3 ratio and tested for abrasion dust generation and mechanical durability. The average abraded dust level reduction was 99.0% compared to the dust level of the uncoated wood pellets, as described in Example 1. The mechanical durability measured 98.2%.

Example 6

Wood pellets were treated with 0.44 wt. % of CTO, tall oil pitch (TOP), and tall oil head (TOH) blended at a 5/3/2 ratio and tested for abrasion dust generation and mechanical durability. The average abraded dust level reduction was 99.6% compared to the dust level of the uncoated wood pellets, as described in Example 1. The mechanical durability measured 99.6%.

Example 7

Wood pellets were treated with 0.44 wt. % of soy oil and tested for abrasion dust generation and mechanical durability. The average abraded dust level reduction was 86.2% compared to the dust level of the uncoated wood pellets, as described in Example 1. The mechanical durability measured 99.2%. The tested wood pellets were then stored at room temperature with humidity around 60% RH for 30 days. The aged wood pellets were re-tested again for abraded dust reduction. The measured abraded dust reduction level was 57.2%, substantially lower than the initial abraded dust reduction level of 86.2%.

Example 8

Wood pellets were treated with 0.44 wt. % of distillate tall oil (DTO) and tested for abrasion dust generation and mechanical durability. The average abraded dust level reduction was 98.6% compared to the dust level of the uncoated wood pellets, as described in Example 1. The mechanical durability measured 98.2%.

Example 9

Wood pellets were treated with 0.44 wt. % of tall oil fatty acid (TOFA) and tested for abrasion dust generation and mechanical durability. The average abraded dust level reduction was 98.2% compared to the dust level of the uncoated wood pellets, as described in Example 1. The mechanical durability measured 98.1%.

Example 10

Wood pellets were treated with 0.44 wt. % of TOP and TOH blended at a 6/4 ratio and tested for abrasion dust generation and mechanical durability. The average abraded dust level reduction was 98.9% compared to the dust level of the uncoated wood pellets, as described in Example 1. The mechanical durability measured 98.8%.

Example 11

Wood pellets were treated with 0.44 wt. % of CTO and TOP blended at a 1/1 ratio and tested for abrasion dust generation. The average abraded dust level reduction was 98.5% compared to the dust level of the uncoated wood pellets, as described in Example 1. The tested wood pellets were then stored at room temperature with humidity around 60% RH for 30 days. The aged wood pellets were re-tested again for abraded dust reduction. The measured abraded dust reduction level was 96.4%, close to the initial abraded dust reduction level of 98.5%.

Example 12

Uncoated wood pellets were tested in a rubber barrel for their abraded respirable dust level. The average respirable dust level measured was 108±8 mg/m3. Average abraded respirable dust level was also tested for wood pellets treated with a variety of coatings, with the following results:

| Treatment | Average Respirable Dust Level |
|---|---|
| Uncoated | 108 ± 8 mg/m3 |
| Treated with TOP/TOH (6/4 blend ratio) at 0.41 wt. % | .14 mg/m3 |
| Treated with pure canola oil at 0.41 wt. % | 2.6 ± .03 mg/m3 |
| Treated with CTO at 0.41 wt. % | 0.19 ± 0.06 mg/m3 |
| Treated with DTO at 0.41 wt. % | 0.46 ± 0.06 mg/m3 |

Whereas, the devices and methods have been described in relation to the drawings and claims, it should be understood that other and further modifications, apart from those shown or suggested herein, may be made within the spirit and scope of this invention.

What is claimed is:

1. A treated wood pellet comprising:
   a wood pellet; and
   a coating at least partially covering the wood pellet, where the coating is concentrated at a surface of the wood pellet, where the coating comprises less than 1 wt. % of the total weight of the treated wood pellet, and where the coating reduces the generation of dust/fines of the wood pellet upon impact and/or abrasion.

2. The treated wood pellet of claim 1 where the coating increases the durability of the wood pellet.

3. The treated wood pellet of claim 1 where the coating is capable of reacquiring fugitive dust from the wood pellet.

4. The treated wood pellet of claim 1 where the coating is capable of maintaining the reduction of the generation of dust/fines of the wood pellet upon impact and/or abrasion after 30 days of storage.

5. The treated wood pellet of claim 1 where the coating comprises one or more ingredients, where the ingredients comprise crude tall oil, distilled tall oil, tall oil pitch, tall oil fatty acids, tall oil heads, non-food use sustainable wax, or a combination thereof.

6. The treated wood pellet of claim 5 where the coating ingredients are pine chemicals comprising crude tall oil and/or one or more fractions from crude tall oil.

7. The treated wood pellet of claim 6 where the coating does not comprise chemicals that are not crude tall oil or one or more fractions from crude tall oil.

8. The treated wood pellet of claim 5 where the coating does not comprise ingredients that come from seeds or comprise triglyceride.

9. The treated wood pellet of claim 5 where the coating does not comprise lignin.

10. The treated wood pellet of claim 5 where the coating comprises tall oil pitch and tall oil heads in a range from 90% tall oil pitch and 10% tall oil heads to 55% tall oil pitch and 45% tall oil heads.

11. The treated wood pellet of claim 10 where the coating comprises approximately 60% tall oil pitch and approximately 40% tall oil heads.

12. The treated wood pellet of claim 1 where the wood pellet comprises compressed wood.

13. The treated wood pellet of claim 1 where the wood pellet does not comprise torrified wood.

14. The treated wood pellet of claim 1 where the coating is located at the surface of the wood pellet, but not throughout the wood pellet.

15. The treated wood pellet of claim 1 where the treated wood pellet has an average abraded dust level reduction of at least 90% compared to the abraded dust level of the wood pellet.

16. The treated wood pellet of claim 1 where the treated wood pellet has an average abraded dust level reduction and where the average abraded dust level reduction of the treated wood pellet does not reduce by more than 3% after 30 days of storage.

17. The treated wood pellet of claim 1 where the treated wood pellet has an average respirable dust level of less than 2.5 mg/m3.

18. The treated wood pellet of claim 1 where the coating does not penetrate the surface of the wood pellet more than 400 microns.

\* \* \* \* \*